(12) United States Patent
Bateson et al.

(10) Patent No.: US 6,355,880 B1
(45) Date of Patent: Mar. 12, 2002

(54) OUTLET COVER ASSEMBLY FOR RACEWAY

(75) Inventors: Gary W. Bateson, Preston; Peter A. Czerner, Monore; Joseph V. DeBartolo, Jr., North Stonington; Stephen R. Ewer, Milford, all of CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/520,803

(22) Filed: Mar. 8, 2000

(51) Int. Cl.[7] ............................................. H02G 13/00
(52) U.S. Cl. ..................... 174/48; 174/67; 220/4.02; 52/220.3
(58) Field of Search ............................. 174/48, 49, 50, 174/58, 60, 66, 67; 220/3.2, 3.8, 4.02, 242, 3.3, 3.92, 241; 52/220.3, 220.7

(56) References Cited

U.S. PATENT DOCUMENTS

| | | | | |
|---|---|---|---|---|
| 3,262,083 A | * | 7/1966 | Gooding | 174/48 X |
| 5,478,032 A | * | 12/1995 | Miller | 174/48 X |
| 5,732,747 A | * | 3/1998 | Holliday | 138/163 |
| 5,998,732 A | * | 12/1999 | Caveney et al. | 220/4.02 X |

FOREIGN PATENT DOCUMENTS

| | | | | |
|---|---|---|---|---|
| EP | 000535527 | * | 4/1993 | 174/48 |

* cited by examiner

*Primary Examiner*—Dean A. Reichard
*Assistant Examiner*—Dhiru R. Patel
(74) *Attorney, Agent, or Firm*—Alfred N. Goodman; Garrett V. Davis (57) ABSTRACT

A raceway assembly includes a raceway and a cover assembly removably coupled to the raceway. The cover assembly is mounted flush on the raceway to avoid restriction of the channels formed in the raceway. The cover assembly includes at least one base that is snapped onto the raceway for supporting a wiring device and includes an access opening for accessing wires or cables in the raceway. The base can be used alone or can be assembled in a ganged relation with an identical base. A cover having an access opening is coupled to the base to enclose the base and the electrical data, telecommunications device. A face plate covers the access opening of the cover and is attached to the wiring device to secure the cover to the wiring device, base and raceway.

40 Claims, 7 Drawing Sheets

OUTLET COVER ASSEMBLY FOR RACEWAY

FIELD OF THE INVENTION

The present invention is directed to an outlet cover assembly for coupling to a surface mounted raceway. More particularly, the invention is directed to a surface mounted raceway assembly having an electrical box and cover assembly mounted on a raceway and enclosing a wiring device.

BACKGROUND OF THE INVENTION

Surface mounted raceways and recessed raceways are commonly used in buildings for enclosing electrical wires and communication cables. Raceways provide a convenient system for directing cables and wires from a source to the point of use. Preformed raceways are generally manufactured in predetermined lengths and are assembled at the work site.

Raceways often have two or more distinct passages for separating groups of cables and wires. For example, a raceway can include a first passage for electrical power cables and a second passage for telephone lines and other communication cables. The raceways typically include an internal wall to separate the passages and isolate the wires or cables in the passages from each other. A suitable receptacle is usually mounted directly to the raceway for accessing the wires and cables contained in the raceway.

One example of a raceway is disclosed in U.S. Pat. No. 4,952,163 to Dola et al. This patent discloses a raceway having multiple compartments that can be recessed in a wall or other support structure. A receptacle outlet housing is attached directly to the raceway. The receptacle outlet housing is an integral unit having a front wall and a back wall connected by end walls and open sides. The open sides are closed with removable side panels.

Another example of a preformed raceway is disclosed in U.S. Pat. No. 5,010,211 to Bartee. This device includes an electrical duct system for mounting in the floor of a building and includes several longitudinal passages. An access housing is formed in the top of the raceway for supporting electrical outlet devices. A divider is positioned in the housing to divide the interior into different chambers for mounting different electrical outlets.

These prior raceway assemblies are generally effective for housing wires and cables and supporting electrical outlets. However, these devices can be difficult and time consuming to assembly and require numerous components that must be manufactured. Accordingly, there is a continuing need in the industry for an improved raceway assembly.

SUMMARY OF THE INVENTION

The present invention is directed to an outlet cover assembly for a raceway. More particularly, the invention is directed to a raceway assembly for enclosing various wires and cables and for supporting a wiring device.

Accordingly, a primary object of the invention is to provide an outlet cover assembly for a raceway where the assembly forms a housing enclosing a wiring device that is mounted on an exterior surface of the raceway.

A further object of the invention is to provide an outlet cover assembly that is simple to assemble and that can be disassembled using commonly available tools.

Another object of the invention is to provide an outlet cover assembly that can be assembled by snapping the components together without the need for special tools.

Another object of the invention is to provide a cover assembly having a base member coupled to a raceway and an outer cover attached to the base for enclosing a wiring device.

A further object of the invention is to provide an outlet cover assembly for a raceway having a base coupled to the raceway, a cover coupled to the base and a face plate coupled to the base for attaching the cover to the base.

Another object of the invention is to provide an outlet cover assembly having a base that can be ganged with a similar base and coupled to a raceway for forming a multigang electrical box.

Another object of the invention is to provide an outlet cover assembly for a raceway having a base with a bottom wall and a coupling member for coupling the base to the raceway and a spacer for spacing the bottom wall of the base from the raceway.

Still another object of the invention is to provide an outlet cover assembly with a base having a coupling member for coupling the base to a divider in a multichannel raceway.

A further object of the invention is to provide a raceway assembly having a raceway, a base coupled to the raceway for supporting a wiring device, and a cover enclosing the base and wiring device.

The objects of the invention are basically obtained by providing an outlet cover assembly for use with an electrical raceway. The assembly comprises a base having a bottom wall, an open top end, a mounting member for mounting a wiring device to the base, and a first coupling member for coupling the base to the electrical raceway. A removable cover member has a front wall and opposite end walls. The cover member is coupled to the base and forms an enclosure with the base for the wiring device. The front wall of the cover has an opening for the wiring device.

The objects of the invention are further attained by providing an outlet cover assembly for use with an electrical raceway. The assembly comprises a base having a bottom wall, and first and second side walls. The bottom wall has a top face and a bottom face. The base further has at least one first coupling member extending from the bottom face for coupling with the raceway, and at least one second coupling member extending from the top face of the bottom wall. A cover has a front wall and opposite end walls. The end walls have a third coupling member for cooperating with the second coupling member for coupling the cover to the base. The front wall has an opening for the wiring device.

The objects of the invention are also attained by providing an electrical conductor assembly which comprises a raceway having opposite side walls for forming at least one longitudinal channel, and at least one base having a first coupling member removably coupling the base to the raceway. The base further has at least one access opening to the at least one channel in the raceway, a wiring device mounting member, and a second coupling member. A wiring device is coupled to the mounting member. A cover has a front wall, opposite end walls, and a third coupling member for coupling with the second coupling member. The cover is removably coupled to the base. The front wall has an opening for the wiring device.

The objects, advantages, and salient features of the invention will become apparent to one skilled in the art in view of the following detailed description of the invention and the attached drawings which form a part of this original disclosure.

BRIEF DESCRIPTION OF THE DRAWINGS

The following is a brief description of the drawings in which.

DETAILED DESCRIPTION OF THE INVENTION

The present invention is directed to a raceway and cover assembly 10 for supporting a wiring device. More particularly, the invention is directed to an outlet cover assembly 12 for coupling to a raceway 14. The raceway and cover assembly 10 is particularly suitable for surface mounting to a wall or other support surface for enclosing various electrical wires and cables.

Figure 1:
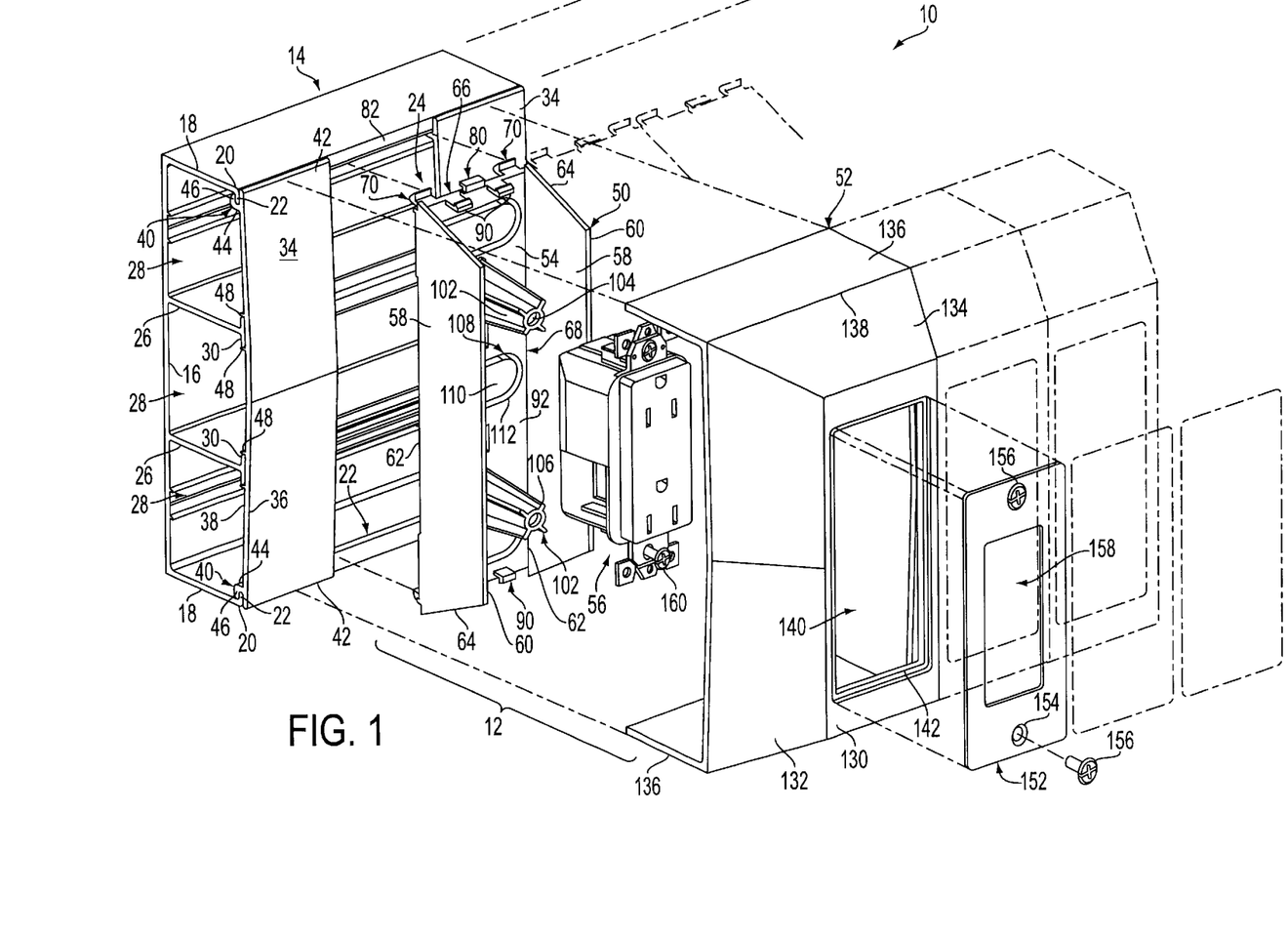
FIG. 1 is an exploded perspective view of the raceway assembly in one embodiment of the invention.
Figure 3:
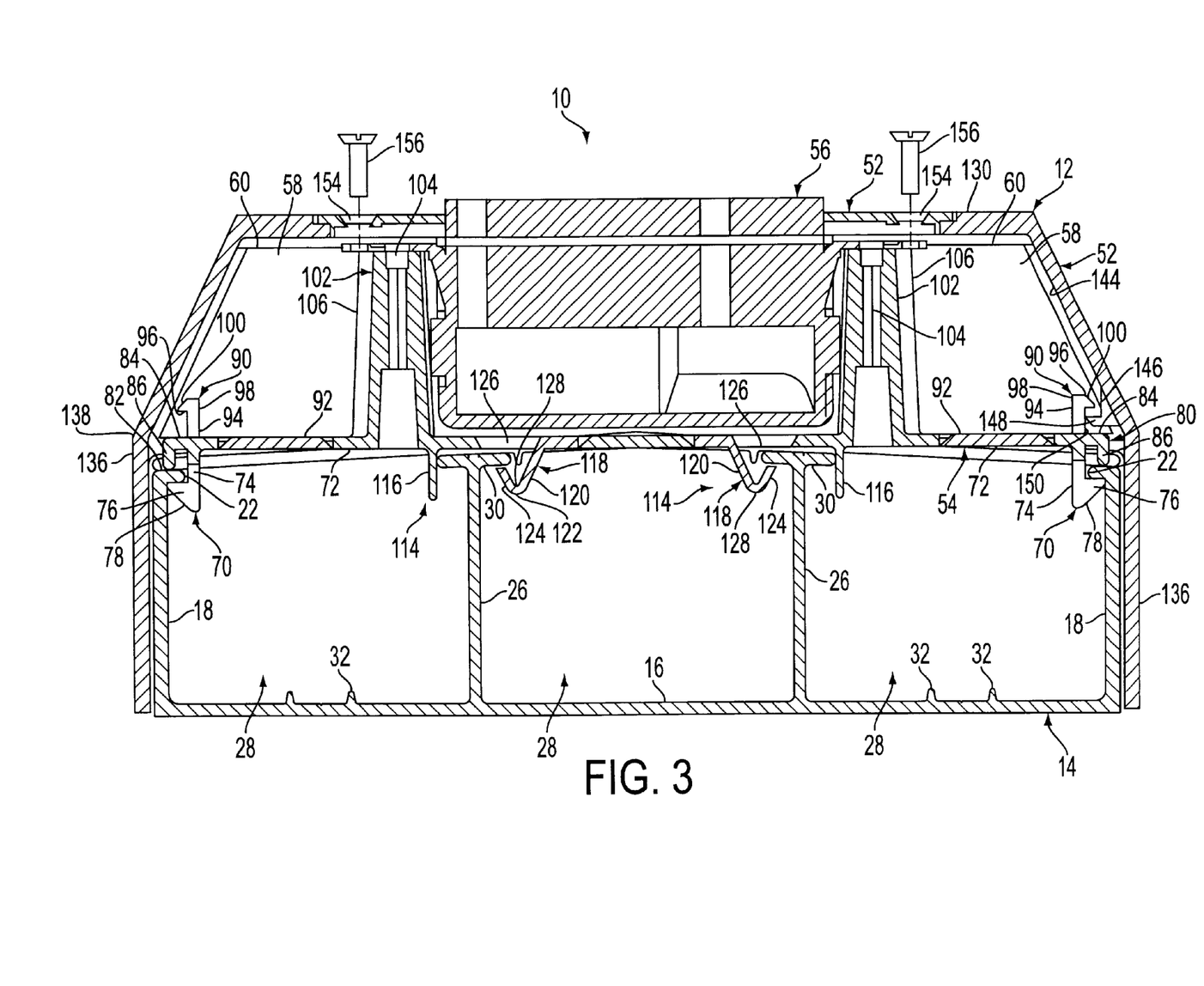
FIG. 3 is a cross-sectional view of the assembly taken along line 3—3 of FIG. 2.

Referring to FIG. 1, raceway 14 is an elongated structure having a bottom wall 16 and opposite side walls 18. Side walls 18 each have a top end 20 with an inwardly extending lip 22. As shown in FIGS. 1 and 3, lip 22 extends inward from each side wall 18 substantially parallel to bottom wall 16. Preferably, lip 22 is integrally formed with side wall 18 and has a longitudinal length corresponding to a longitudinal length of side wall 18 so lip 22 is continuous with side wall 18.

In the embodiment illustrated, raceway 14 includes at least one inner wall 26 integrally formed with bottom wall 16 and extending substantially parallel to side walls 18. In the embodiment illustrated, two inner walls 26 are provided to form three distinct channels 28 extending the longitudinal length of raceway 14. Inner wall 26 has a height substantially equal to a height of side walls 18. Preferably, inner wall 26 has a top end with a cross member 30 so that inner walls 26 have a generally T-shaped cross section. In one embodiment of the invention, longitudinal strengthening ribs 32 are formed on bottom wall 16 and extend the longitudinal length of raceway 14.

In the illustrated embodiment, inner walls 26 are spaced apart to form three channels 28 of substantially uniform dimensions. In further embodiments, inner walls 26 can be spaced to form channels of different sizes to accommodate different wires or cables.

Raceway 14 is dimensioned for enclosing various wires and cables from a power source (not shown) to a point of use. More particularly, raceway 14 is dimensioned to carry electrical power cables, telephone wiring and other communication cables in separate channels 28 to separate the wires and cables. Raceway 14 has an open top end 24 for enabling access to the wires and cables contained within raceway 14 at any point along the length of the raceway 14.

Figure 2:
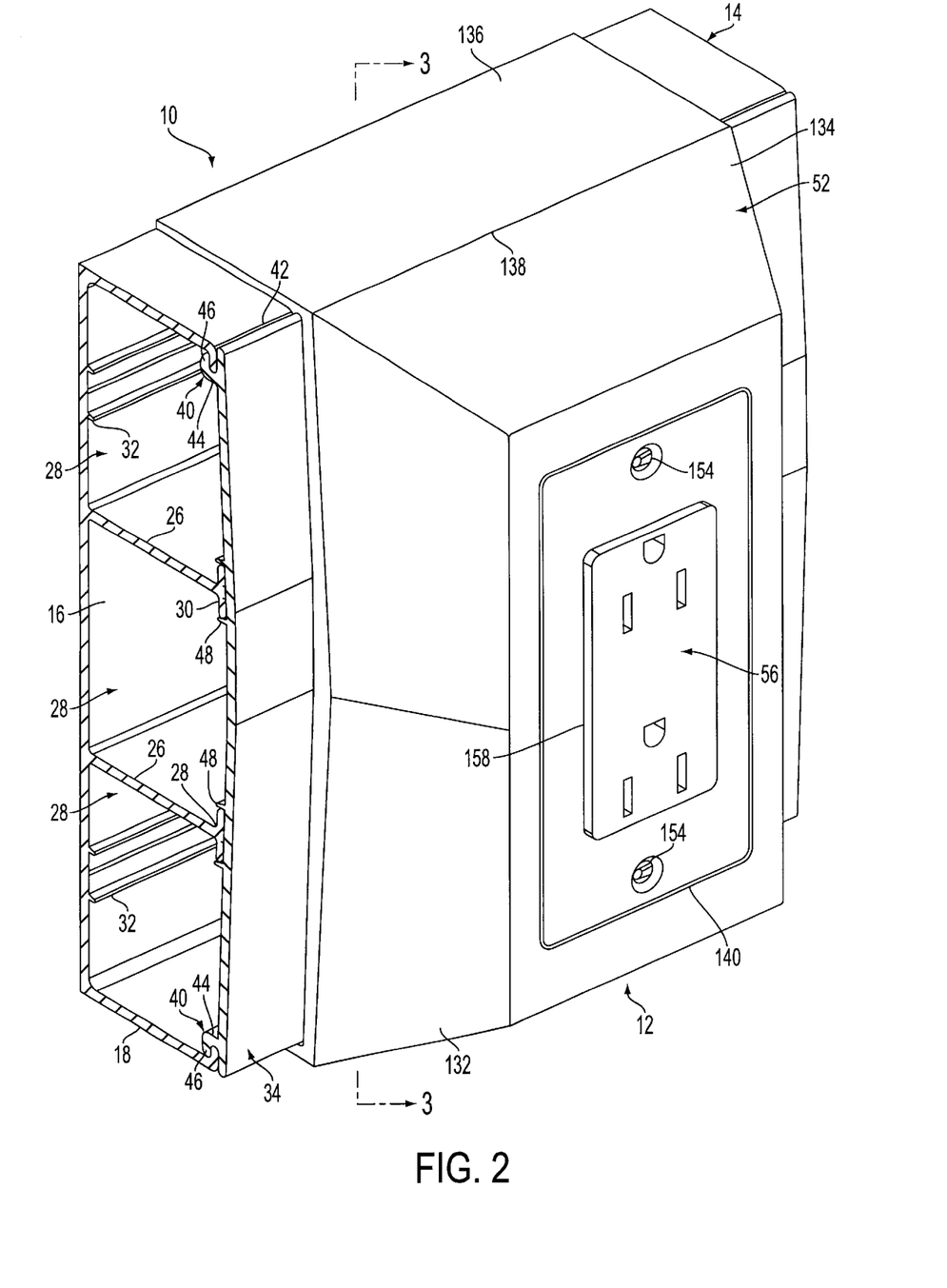
FIG. 2 is a perspective view of the assembled raceway and outlet cover assembly of the embodiment of FIG. 1.

A removable raceway cover 34 is coupled to raceway 14 to enclose channels 28 carrying the wires and cables. Raceway cover 34 has a width corresponding to the width of raceway 14 and a length sufficient to cover open top end 24. Raceway cover 34 has an outer face 36, an inner face 38, and longitudinal edges 42. A coupling member 40 is provided on inner face 38 adjacent longitudinal edges 42 of raceway cover 34. Coupling member 40 in the embodiment illustrated is a hook shaped member having a first leg 44 extending substantially perpendicular to the plane of raceway cover 34 and a second leg 46 extending substantially perpendicular to first leg 44 in an outward direction. Preferably, coupling member 40 is integrally formed with raceway cover 34 and extends the longitudinal length of raceway cover along longitudinal edges 42. As shown in FIGS. 1 and 2, coupling member 40 forms a hook engaging lip 22 of side walls 18. Second leg 46 of coupling member 40 has a generally inclined or curved outer face to enable raceway cover 34 to snap easily onto raceway 14. In the embodiment illustrated, inner face 38 of raceway cover 34 includes longitudinal ribs 48 for mating with each side of cross member 30 of inner wall 26.

Raceway 14 and raceway cover 34 are preferably formed from extruded plastic that is cut to a desired length. The plastic material is sufficiently ridged to provide adequate support for electrical devices and wiring. Preferably, raceway cover 34 is sufficiently flexible to be able to snap into coupling engagement with raceway 14.

Figure 6:
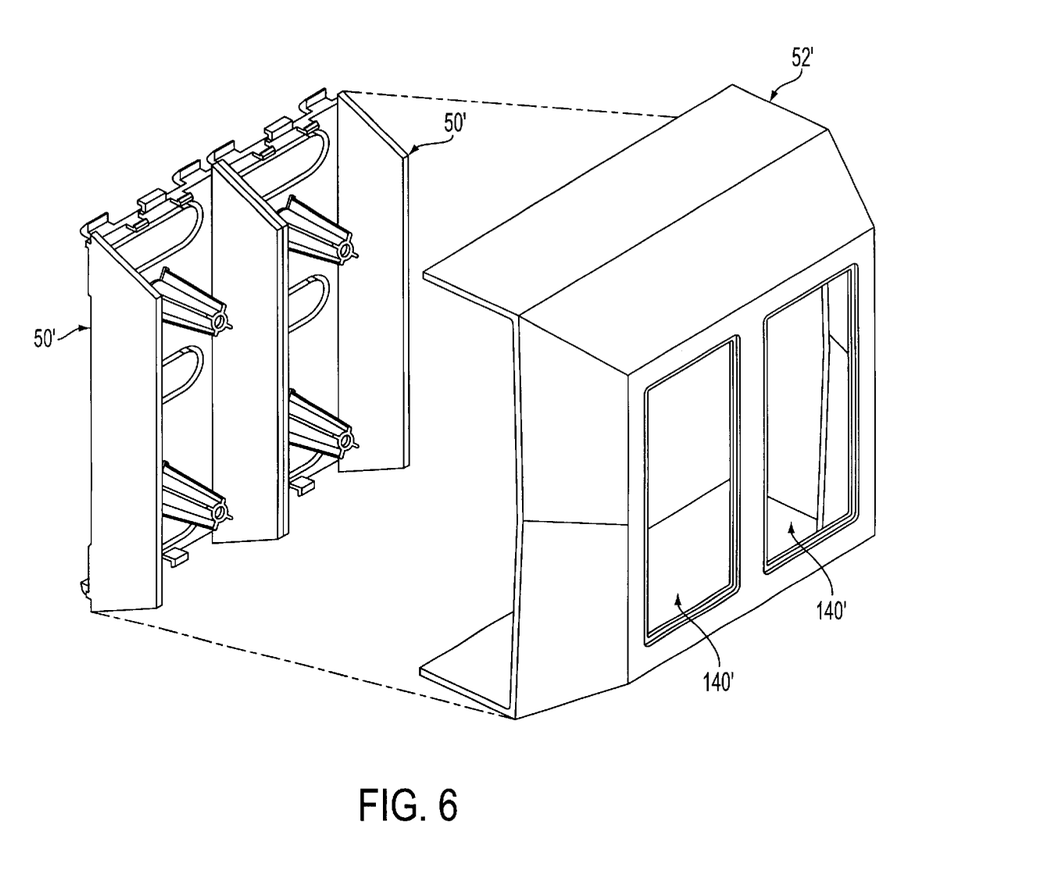
FIG. 6 is an exploded perspective view of a two gang outlet cover assembly showing two base members in a ganged relationship.
Figure 7:
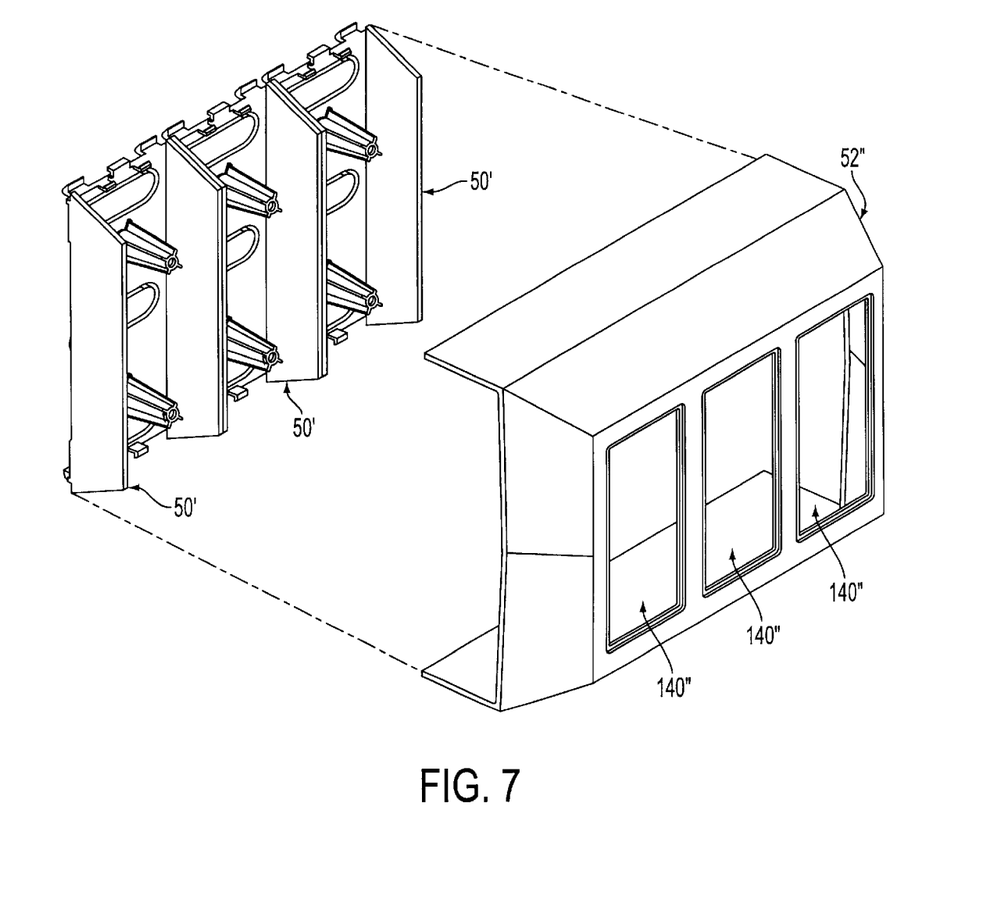
FIG. 7 is an exploded perspective view in a third embodiment showing a three gang outlet cover assembly having three base members assembled in a ganged relationship.

Referring to FIGS. 1–3, outlet cover assembly 12 includes a modular base 50 and a cover 52. Modular base 50 is structured to be used alone or used in combination with multiple modular bases in a ganged fashion as shown in FIGS. 6 and 7.

Base 50 includes a bottom wall 54 having a longitudinal dimension corresponding substantially to the width of raceway 14 and a transverse dimension sufficient to support a wiring device 56. Side walls 58 are coupled to bottom wall 54 along the longitudinal side edges of bottom wall 54. Preferably, side walls 58 are integrally formed with bottom wall 54 and are substantially perpendicular to bottom wall 54.

As shown in FIG. 1, side walls 58 have a top edge 60 substantially parallel with a bottom edge 62 and inclined side edges 64 to form a substantially trapezoidal shape. Top edge 60 in the embodiment illustrated has a longitudinal length less than the longitudinal length of bottom edge 62 so that side edges 64 converged towards top edge 60. In alternative embodiments, side walls 58 can be substantially rectangular. Preferably, side walls 58 have a shape corresponding substantially to an inner surface of cover 52 as discussed hereinafter in greater detail.

Figure 5:
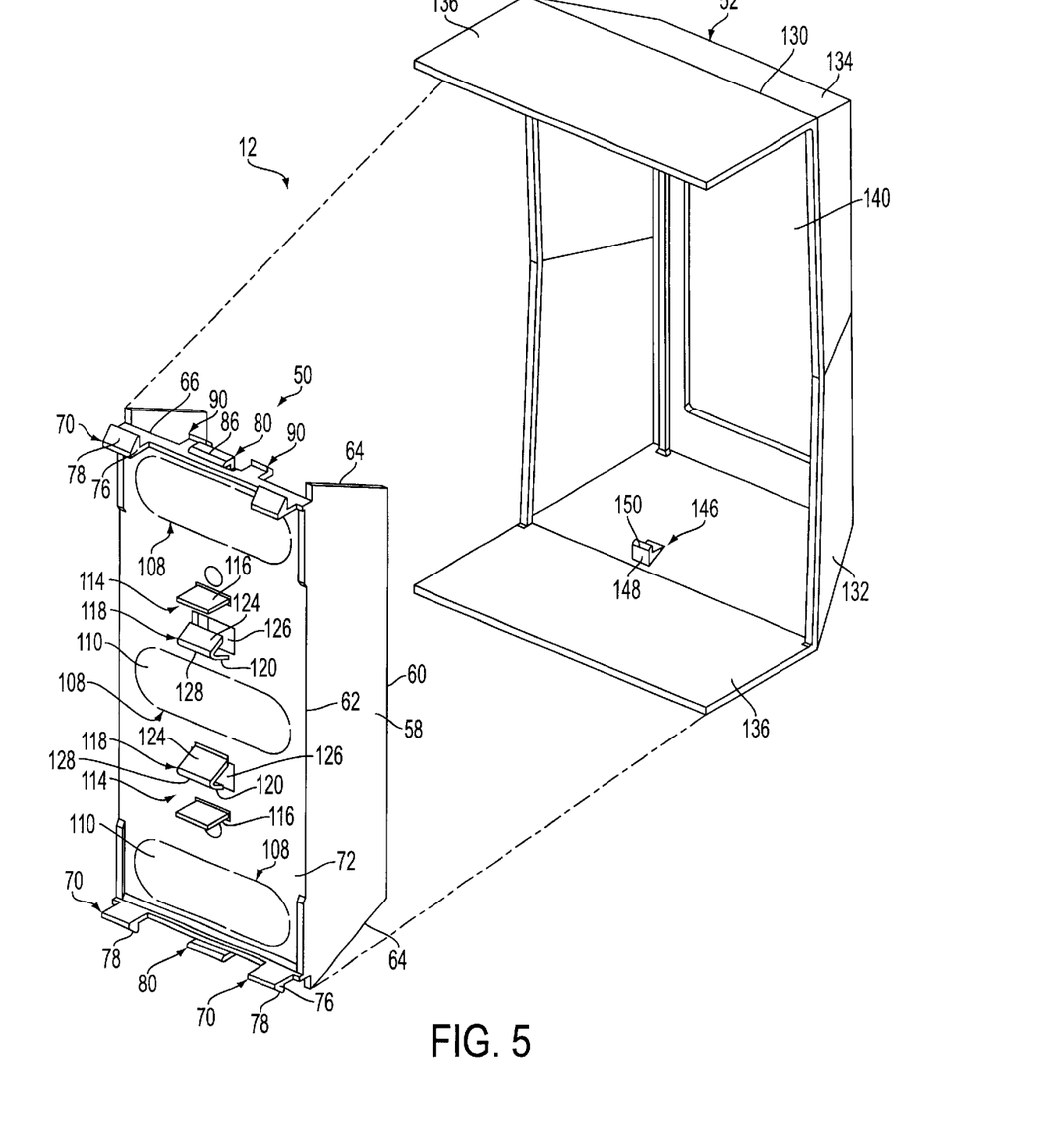
FIG. 5 is an exploded perspective view of the outlet cover assembly of FIG. 1 showing the rear side of the base and cover.

Referring to FIG. 5, bottom wall 54 has transverse ends 66 extending between longitudinal edges 68. A coupling member 70 is provided on each transverse end 66 for coupling base 52 to raceway 14. In a preferred embodiment, two coupling members 70 are provided on each transverse end 66 as shown in FIGS. 1 and 5 and are positioned next to longitudinal edges 68 of bottom wall 54. Each coupling member 70 is an integrally formed hook-like member extending in a generally perpendicular direction from a bottom face 72 of bottom wall 54. As shown in FIG. 3, coupling member 70 includes a first leg 74 extending perpendicular from bottom wall 54 and a second leg 76 extending in a general outward direction perpendicular to first leg 74. Second leg 76 includes an inclined face 78 for guiding coupling member 70 over lip 22 of raceway 14 when base 50 is snapped into engagement with raceway 14.

A spacer member 80 is provided on each transverse end 66 of base 50 for engaging a top surface 82 of lip 22 of raceway 14. As shown in FIG. 1, spacing member 80 has a width less than a width transverse end 66 of base 50 and is positioned between coupling members 70. Spacing member 80 is formed by a first leg 84 extending outwardly from transverse ends 66 and is coplanar with base 50. A second leg 86 extends from an outer end 88 of first leg 84 in a downward direction substantially perpendicular with first leg 84 in the direction of coupling members 70. Second leg 86 of spacer 80 engages lip 22 of raceway 14 to support base 50. As shown in FIG. 3, leg 86 has a length sufficient to space bottom wall 54 of base 50 from lip 22 and form a small gap between bottom wall 54 and lip 22. The gap allows a tool, such as the tip of a screwdriver, to be inserted between base 50 and lip 22 of raceway 14 to uncouple base 50 from raceway 14.

Referring to FIGS. 1 and 3, coupling members 90 are provided on a top face 92 of bottom wall 54 for coupling with cover 52. In preferred embodiments, two coupling members 90 are provided along each transverse end 66 of bottom wall 54. Coupling members 90 are positioned adjacent each side of spacer member 80 and extend in a generally perpendicular direction to the plane of bottom wall 54. As shown in FIG. 3, coupling members 90 form a generally hook-like device having a first leg 94 extending perpendicular to bottom wall 54 and a second leg 96 extending outwardly from an outer end 98 of first leg 94. Second leg 96 includes an inclined outer face 100 to assist in coupling with cover 52.

Figure 4:
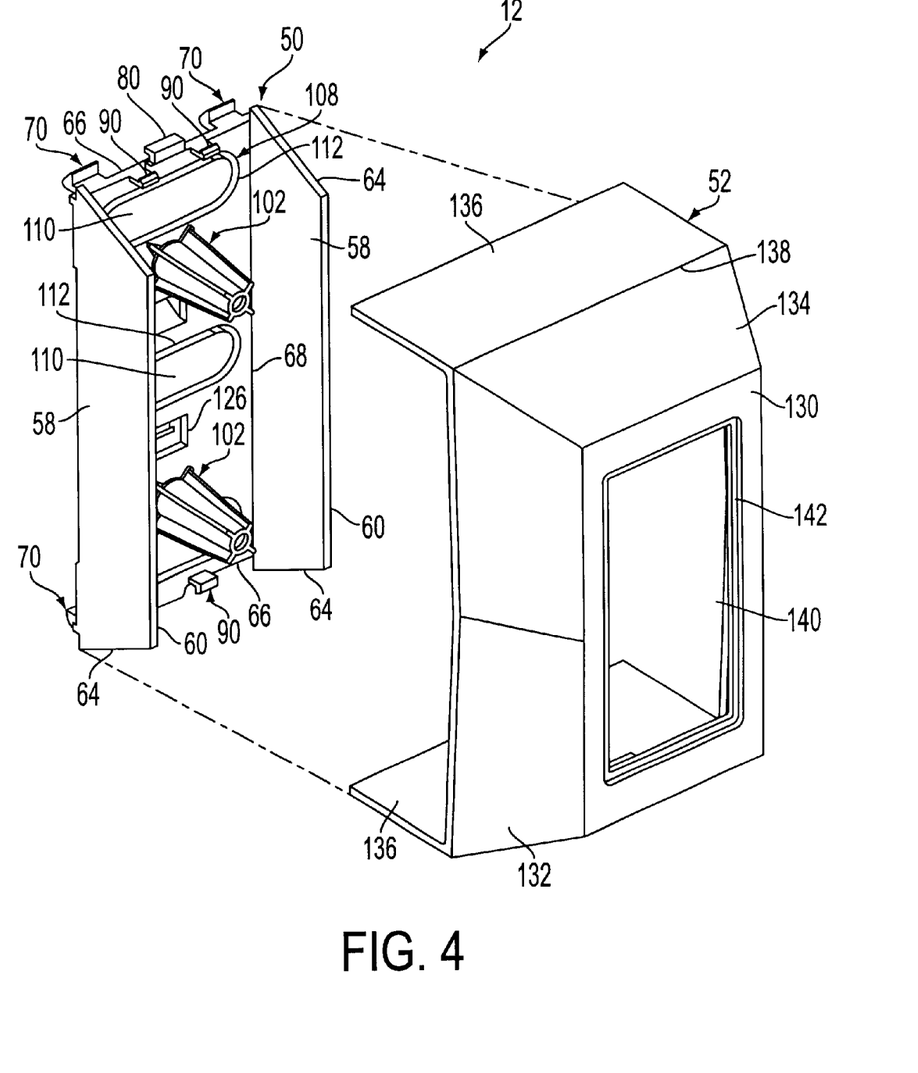
FIG. 4 is an exploded perspective view showing the front side of the base and cover of the outlet cover assembly of FIG. 1.

As shown in FIGS. 1 and 4, wiring device mounting members 102 extend upwardly from bottom wall 54. In preferred embodiments, two spaced-apart mounting members 102 are provided for supporting wiring device 56. Mounting members 102 form a post having an axial passage 104 for receiving a screw or other fastener for coupling wiring device 56 to mounting member 102. Strengthening ribs 106 extend longitudinally along mounting members 102 to provide lateral strength to mounting members 102.

At least one access 108 is provided in bottom wall 54 to provide access to each chamber 28 of the raceway 14. Access 108 in a preferred embodiment is an opening having a knock-out plate 110. In the embodiment illustrated, three access openings 112 are provided to access each of the three channels 28. In preferred embodiments, at least one access opening is provided for each channel 28 of raceway 14.

Referring to FIG. 3, base 50 is coupled to raceway 14 by positioning base 50 with coupling members 70 adjacent lip 22 of raceway 14. Base 50 is then pressed downwardly toward raceway 14 until coupling members 70 snap into position over lip 22 as shown in FIG. 3. Coupling members 70 allow base 50 to slide on raceway 14 to a desired position.

In one embodiment of the invention, base 50 includes a coupling member 114 for coupling with each inner wall 26 of raceway 14. Referring to FIGS. 3 and 5, coupling member 114 includes a flanged 116 extending in a generally perpendicular direction from bottom face 72 of bottom wall 54 for engaging one side of cross member 30 of inner wall 26. A generally V-shaped snap member 118 spaced from flange 116 extends from the bottom face 72 of bottom wall 54 for engaging the opposite side of cross member 30. V-shaped snap member 118 includes a first leg 120 extending diagonally from bottom wall 54. An outer end 122 of first leg 120 is coupled to a second leg 124 extending upwardly toward bottom wall 54. As shown in FIG. 3, second leg 124 has a length less than first leg 120 for engaging the underside of cross member 30. In the embodiment illustrated, two V-shaped snap members 118 are provided for engaging each of the inner walls 26.

An opening 126 is formed in bottom wall 54 adjacent flange 116 and V-shaped snap members 118. Opening 126 is dimensioned to allow a tool to be inserted to engage the intersection 128 of first leg 120 and second leg 124 to pry V-shaped snap members 118 away from cross member 130. This enables V-shaped snap member 118 to disengage from cross member 30 for removing base 50 from raceway 14. During assembly, V-shaped snap members 118 are sufficiently flexible that a downward pressure on base member enables snap members 118 to snap over cross members 30 to assist in securing base 50 to raceway 14.

Cover 52 is dimensioned to enclose base 50 and includes a top wall 130, side walls 132 and end walls 134. In the embodiment illustrated, side walls 132 and end walls 134 are inclined and converge toward top wall 130. A side panel 136 is coupled to a bottom end 138 of each end wall 134 and extends away from top wall 130. Preferably, side panels 136 are substantially parallel to each other. Cover 52 is dimensioned so that side panels 136 overlie side walls 18 of raceway 14 as shown in FIG. 3.

Top wall 130 of cover 52 includes an opening 140 dimensioned to accommodate wiring device 56. Preferably, a recessed ledge 142 is formed along the periphery of opening 140. In the embodiment illustrated, opening 140 has a generally rectangular shape to accept a wall or face plate 152. In alternative embodiments, opening 140 can have a shape and dimension to compliment the specific wiring device being mounted on base 50 and connected to raceway 14.

Referring to FIGS. 4 and 5, each end wall 134 of cover 52 has an inner face 144 that is inclined with respect to top wall 130. A coupling member 146 is provided on inner face 144 of each end wall 134 for coupling with coupling member 90 on top face 92 of bottom wall 54. Coupling member 146 includes a leg 148 extending inwardly toward a center of base 50 in a direction generally parallel with bottom wall 54. Leg 144 has an inclined face 150 complimenting inclined face 100 of coupling member 90 to enable coupling members 90 to slide over coupling member 146 and snap into the position shown in FIG. 3.

A face plate 152 having a dimension corresponding substantially to recessed ledge 142 of opening 140 in top wall 130 is coupled to wiring device 56. In the embodiment illustrated, face plate 152 is provided with two apertures 154 for receiving a mounting screw 156. An opening 158 is provided in face plate 152 to accommodate wiring device 56. Face plate 152 is nested in recessed ledge 142 and coupled to wiring device 56 to prevent cover 52 from separating from base 50.

In use, raceway 14 is mounted on a wall or other suitable support surface and electrical cables and wires passed through the desired channels 28. Base 50 is placed in the desired position along the longitudinal length of raceway 14 and pressed to snap the coupling members 70 and 114 over lip 22 into engagement with raceway 14. The coupling members 70 and 114 on base 50 enable base 50 to slide along the longitudinal length of raceway 14 to a desired position. Knock-out plugs 110 can be removed to access the respective channel 28 of raceway 14. The wires or cables in the channel 28 of the raceway 14 are fed through access opening 112 and attached to wiring device 56. In the embodiment illustrated, wiring device 56 is a duplex receptacle. In further embodiments, wiring device 56 can be, for example, a telephone jack or other coupling member.

Wiring device 56 is attached to mounting members 102 by screws 160 or other suitable fasteners. Cover 52 is then placed over base 50 and snapped onto coupling members 90 on base 50. As shown in FIG. 3, wiring device 56 extends through opening 140 in top wall 130 of cover 52. Face plate 152 is then placed over recessed ledge 142 of opening 140 and screws 156 are inserted through apertures 154 to attach face plate 152 to wiring device 56. Face plate 152 preferably has a dimension greater than the dimension of opening 140 in top wall 130 to secure cover 52 to base 50 and raceway 14.

In the embodiment of FIGS. 1–5, a single base 52 is attached to raceway 14 and opening 140 in cover 52 is dimensioned to accommodate a single wiring device 56. In further embodiments, two or more identical base members 50 can be assembled in a side by side ganged relation as shown in FIGS. 6 and 7. Cover 52' is substantially the same as cover 52 of the embodiment of FIGS. 1–5 except for having two openings 140' for accommodating a wiring device 56' mounted in a respective base 50 so that like elements are identified by the same reference number with the addition of a prime. In a further embodiment shown in FIG. 7, three bases 50 are arranged in a side by side ganged relation for forming a three gang assembly. Cover member 52" is substantially the same as cover 52 of the embodiment of FIGS. 1–5 except that three openings 140" are provided to access each base 50.

While various embodiments have been chosen to illustrate the invention, it will be appreciated by those skilled in the art that various modifications and additions can be made to the raceway assembly without departing from the scope of the invention as defined in the appended claims.

What is claimed is:

1. An outlet cover assembly for use with an electrical raceway, said assembly comprising:
    a base having a bottom wall, an open top end, a mounting member for mounting a wiring device to said base, and a first coupling member on said bottom wall for coupling said base to an electrical raceway; and
    a removable cover having a front wall and opposite end walls, said cover coupled to said base and forming an enclosure with said base for the wiring device, said front wall of said cover having an opening for the wiring device.

2. The assembly of claim 1, wherein said mounting member comprises two spaced apart posts extending from said bottom wall.

3. The assembly of claim 1, wherein said base further comprises a second coupling member on said bottom wall for removably coupling with said removable cover.

4. The assembly of claim 3, wherein said end walls of said cover have an inner face with a third coupling member for coupling with said second coupling member of said base.

5. The assembly of claim 4, wherein said second coupling member is a hook member on said bottom wall, and wherein said third coupling member on said cover is a ridge for coupling with said hook member.

6. The assembly of claim 1, wherein said base includes opposite side walls.

7. The assembly of claim 1, wherein said bottom wall of said base includes at least one access opening to said raceway.

8. The assembly of claim 1, further comprising a face plate for said cover for coupling with the wiring device and for coupling said cover to said base, wherein said face plate has a dimension greater than a dimension of said opening in said cover.

9. The assembly of claim 1, wherein the opening in said cover conforms to the periphery of the wiring device.

10. The assembly of claim 1, wherein said first coupling member comprises at least one hook member extending from a bottom face of said base for coupling with said raceway, and said base comprises a spacer on said bottom wall for spacing said bottom wall from said raceway and forming a gap between said bottom wall of said base and said raceway.

11. The assembly of claim 1, wherein said cover member comprises a side panel extending from said end walls for overlying the raceway.

12. An outlet cover assembly for use with an electrical raceway, said assembly comprising:
    a base for supporting a wiring device, said base having a bottom wall, and first and second side walls, said bottom wall having a top face and a bottom face, said base further having at least one first coupling member extending from said bottom face for coupling with a raceway, and at least one second coupling member extending from said top face of said bottom wall, and
    a cover having a front wall and opposite end walls, said end walls having a third coupling member for cooperating with said second coupling member for coupling said cover to said base, and said front wall having an opening for the wiring device.

13. The assembly of claim 12, wherein said bottom wall of said base includes at least one access opening to the raceway.

14. The assembly of claim 12, further comprising at least one mounting member on said bottom wall of said base for supporting a wiring device.

15. The assembly of claim 14, wherein said at least one mounting member comprises a post extending upwardly from said bottom wall.

16. The assembly of claim 12, further comprising a face plate having a dimension greater than a dimension of said opening in said front wall of said cover, wherein said face plate can be coupled to said wiring device for coupling said cover to said base.

17. The assembly of claim 12, wherein said first coupling member comprises at least one hook member extending from said bottom face of said bottom wall of said base for coupling with said raceway, said base further comprising a spacer on said bottom face of said bottom wall for spacing said bottom wall of said base from said raceway.

18. The assembly of claim 12, wherein said second coupling member is a hook member on said bottom wall of said base, and said third coupling member is a ridge for coupling with said hook member.

19. The assembly of claim 12, wherein said cover includes side walls and said cover is dimensioned to enclose said base.

20. The assembly of claim 12, wherein said assembly comprises at least two of said bases coupled to said raceway in a ganged relationship, each of said bases being capable of supporting a wiring device, and wherein said cover is dimensioned to cover said at least two bases.

21. The assembly of claim 20, wherein said front wall of said cover includes an opening for each of said wiring devices.

22. The assembly of claim 21, further comprising a face plate for coupling to each of said wiring devices for covering each of said openings in said opening in said cover.

23. An electrical conductor management assembly comprising:
    a raceway having opposite side walls for forming at least one longitudinal channel;
    at least one base having a first coupling member removably coupling said at least one base to said raceway, said base further having at least one access opening to said at least one channel in said raceway, a wiring device mounting member, and a second coupling member;

a wiring device coupled to said mounting member; and a cover having a front wall, opposite end walls, and a third coupling member for coupling with said second coupling member, said cover being removably coupled to said base, and said front wall having an opening for said wiring device.

24. The assembly of claim 23, wherein said raceway includes at least one internal wall for forming at least two longitudinal channels in said raceway.

25. The assembly of claim 24, wherein said raceway includes at least one internal wall that has a generally T-shape.

26. The assembly of claim 24, wherein said base is coupled to said at least one internal wall.

27. The assembly of claim 26, wherein said base includes a flexible coupling member for coupling to said at least one internal wall.

28. The assembly of claim 27, wherein said at least one internal wall of said raceway includes a cross member whereby said at least one internal wall has a substantially T-shape, and wherein said flexible coupling member is a flexible hook-shaped member for engaging said cross member.

29. The assembly of claim 28, wherein said base includes an opening adjacent said flexible coupling member and being dimensioned to receive a tool for bending said flexible coupling members away from said at least one inner wall.

30. The assembly of claim 23, wherein said first coupling member on said base is a hook member and said side walls of said raceway include a lip for coupling with said hook member.

31. The assembly of claim 23, wherein said base comprises a bottom wall and opposite side walls and an open top end.

32. The assembly of claim 31, wherein said second coupling member for coupling with said cover is a hook member.

33. The assembly of claim 32, wherein said third coupling member on said second coupling member is a ridge.

34. The assembly of claim 23, wherein said base includes a bottom wall having a spacer member for contacting said raceway and defining a gap between said bottom wall and said raceway.

35. The assembly of claim 23, further comprising a cover plate having a dimension greater than said opening in said front wall of said cover, said cover plate being coupled to said wiring device for coupling said cover to said base.

36. The assembly of claim 23, wherein said wiring device is an electrical receptacle, telecommunications device or data device.

37. The assembly of claim 23, comprising at least two of said bases in a ganged relationship, and wherein said cover is dimensioned to enclosed said at least two bases.

38. An outlet cover assembly for use with an electrical raceway, said assembly comprising:

a base having a bottom wall, an open top end, a mounting member for mounting a wiring device to said base, and a first coupling member on said bottom wall for coupling said bottom wall of said base to a top surface of an electrical raceway; and a removable cover having a front wall, said cover coupled to said base and forming an enclosure with said base for said wiring device, said front wall of said cover having an opening for the wiring device.

39. The assembly of claim 38, wherein said base has an open first end and an open second end.

40. The assembly of claim 38, wherein said cover has end walls for closing said first open end and said second open end of said base.

* * * * *